Figures 1, 2:
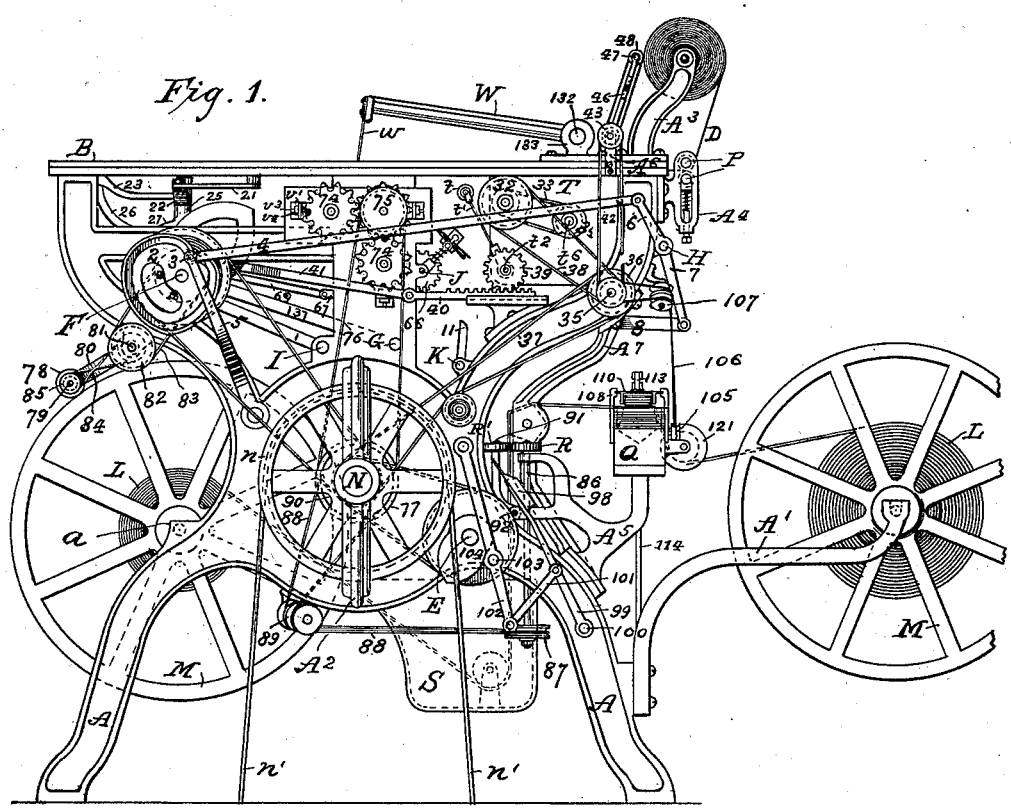

No. 673,421. Patented May 7, 1901.
R. G. CLYNE.
NEWSPAPER WRAPPING MACHINE.
(Application filed Mar. 30, 1898.)
(No Model.) 11 Sheets—Sheet 1.

Witnesses Inventor
Robert G. Clyne
By his Attorney

No. 673,421. Patented May 7, 1901.
R. G. CLYNE.
NEWSPAPER WRAPPING MACHINE.
(Application filed Mar. 30, 1898.)
(No Model.) 11 Sheets—Sheet 2.
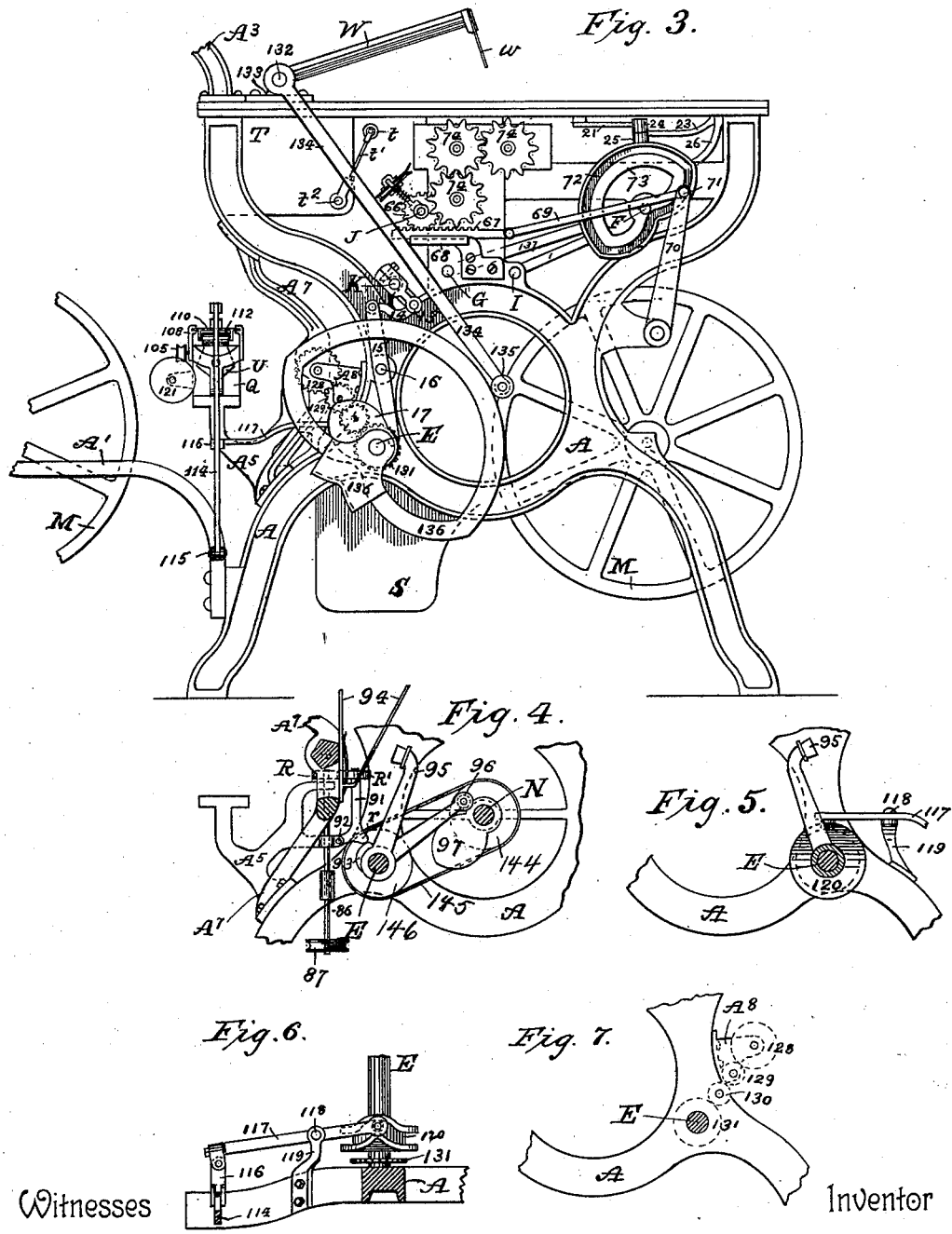
Witnesses Inventor
Robert G. Clyne
By his Attorney No. 673,421. Patented May 7, 1901.
R. G. CLYNE.
NEWSPAPER WRAPPING MACHINE.
(Application filed Mar. 30, 1898.)

(No Model.) 11 Sheets—Sheet 3.

Witnesses
Bayard C. Ryder
W. E. —

Inventor
Robert G. Clyne
By his Attorney

No. 673,421.  
R. G. CLYNE.  
NEWSPAPER WRAPPING MACHINE.  
(Application filed Mar. 30, 1898.)  
Patented May 7, 1901.
(No Model.)  
11 Sheets—Sheet 4.
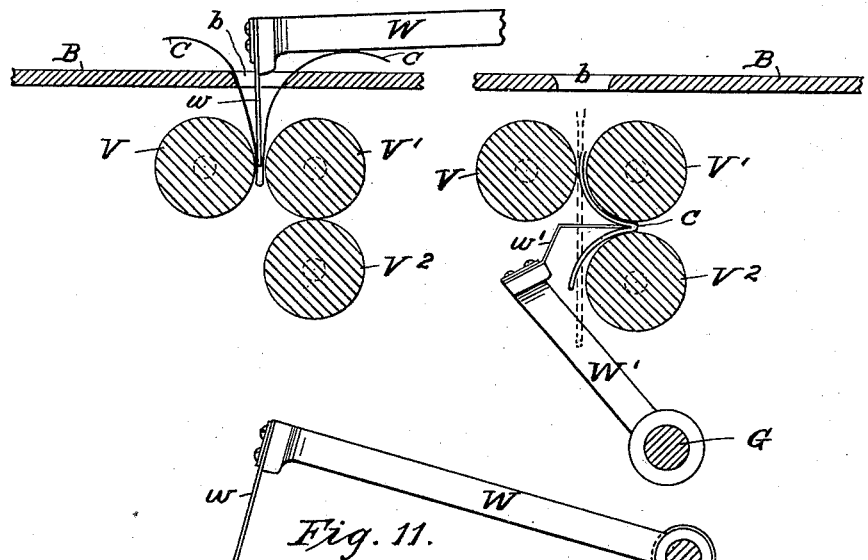
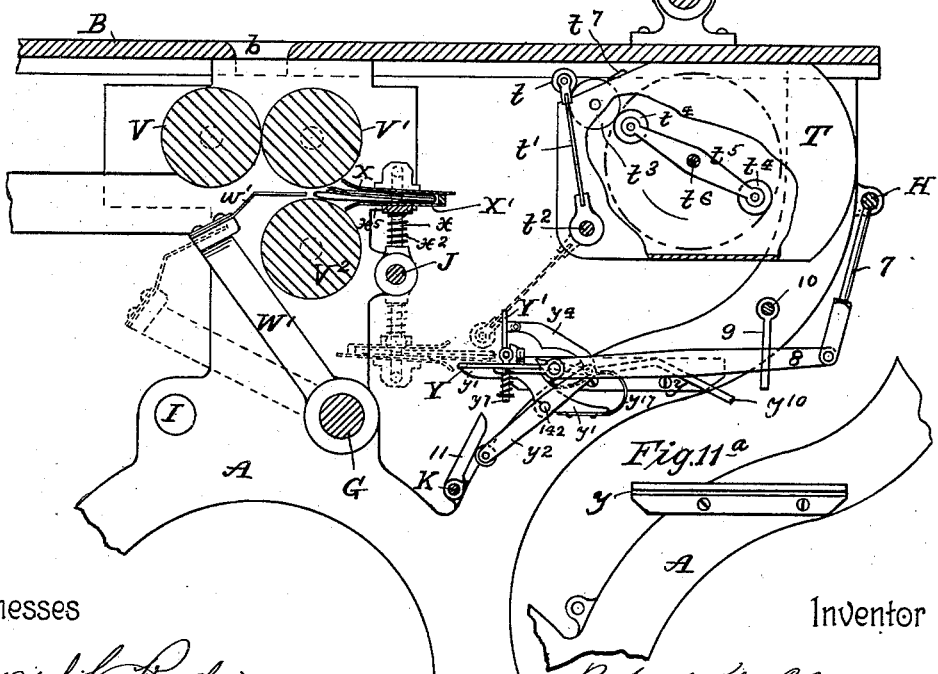
Witnesses  
Inventor  
Robert G. Clyne  
By his Attorney No. 673,421.  
R. G. CLYNE.  
NEWSPAPER WRAPPING MACHINE.  
(Application filed Mar. 30, 1898.)  
(No Model.)  
Patented May 7, 1901.  
11 Sheets—Sheet 5.
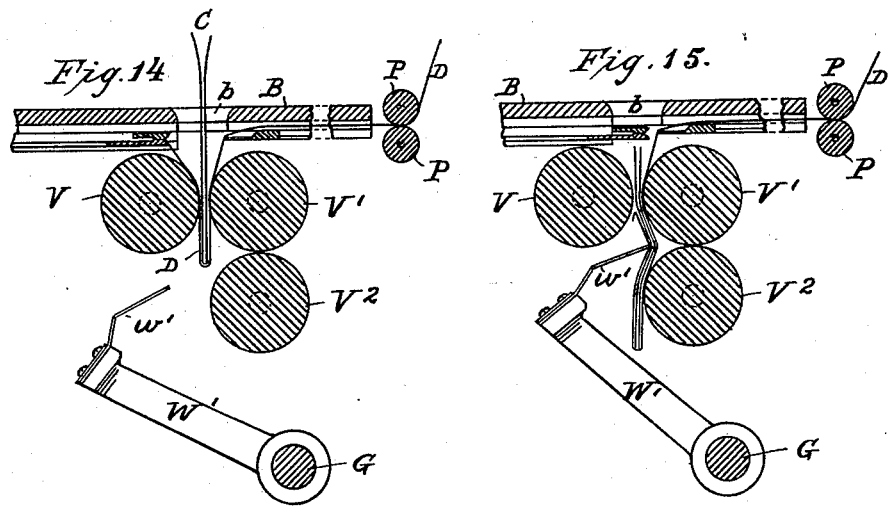
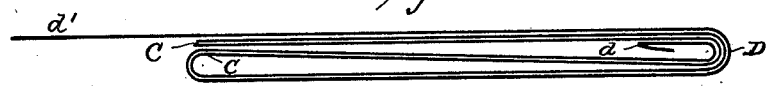
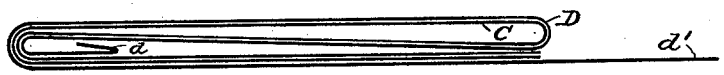
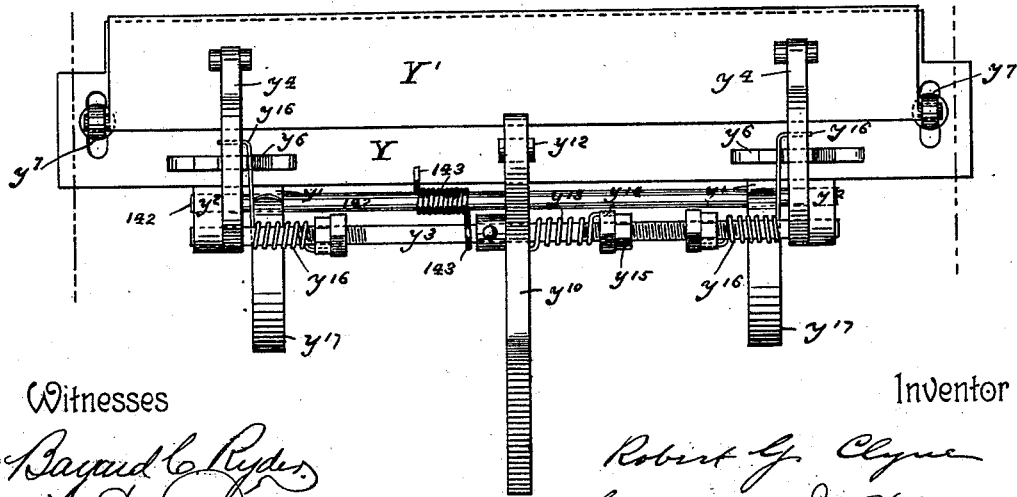
Witnesses  
Inventor  
Robert G. Clyne  
By his Attorney No. 673,421. Patented May 7, 1901.
R. G. CLYNE.
NEWSPAPER WRAPPING MACHINE.
(Application filed Mar. 30, 1898.)
(No Model.) 11 Sheets—Sheet 6.
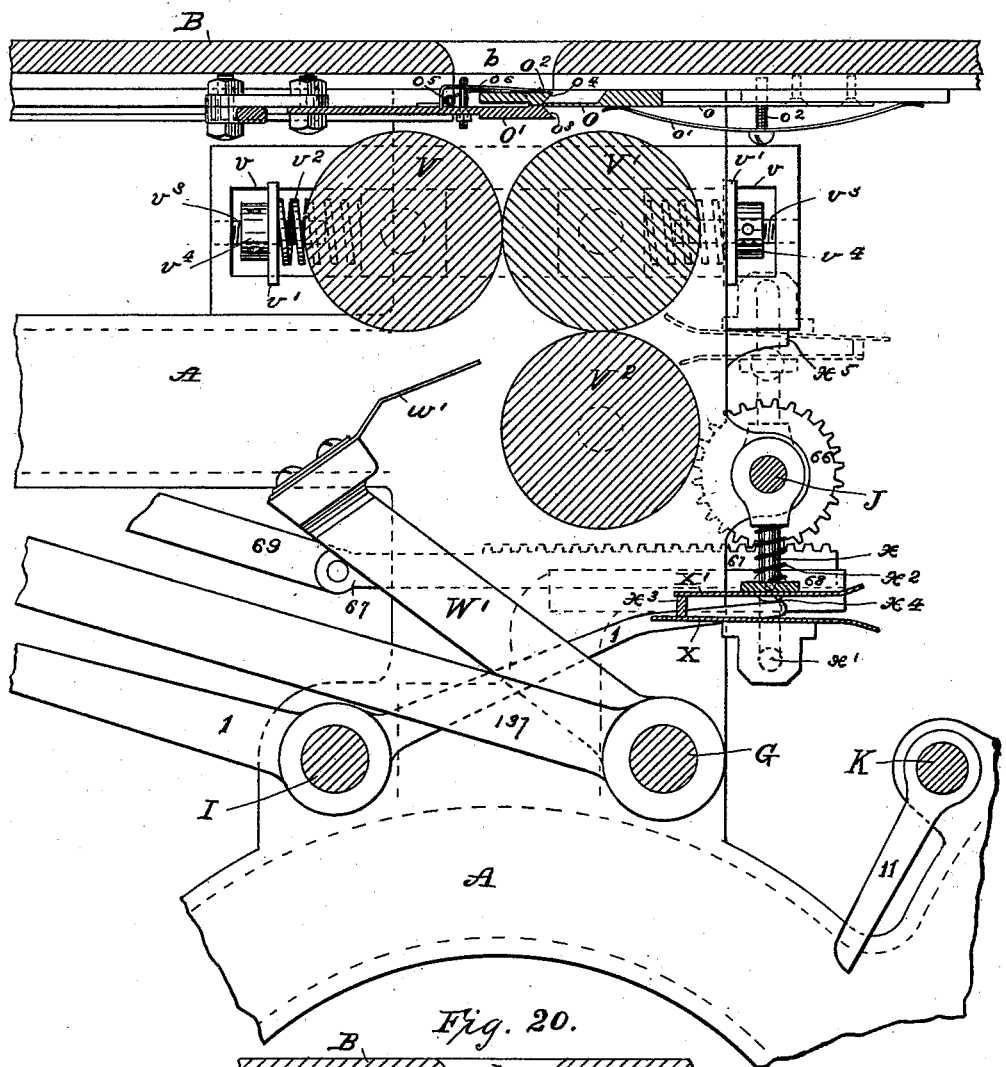
Witnesses
Inventor
Robert G. Clyne
By his Attorney No. 673,421.  
R. G. CLYNE.  
NEWSPAPER WRAPPING MACHINE.  
(Application filed Mar. 30, 1898.)  
Patented May 7, 1901.

(No Model.)  
11 Sheets—Sheet 7.

Witnesses  
Bayard E. Ryder  
W. E. Lewis

Inventor  
Robert G. Clyne  
By his Attorney

No. 673,421. Patented May 7, 1901.
R. G. CLYNE.
NEWSPAPER WRAPPING MACHINE.
(Application filed Mar. 30, 1898.)
(No Model.) 11 Sheets—Sheet 8.
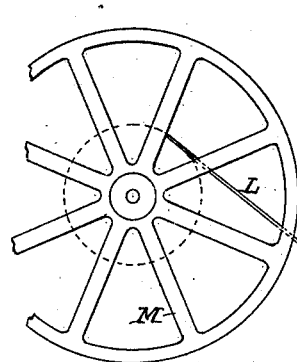
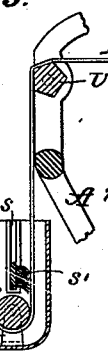
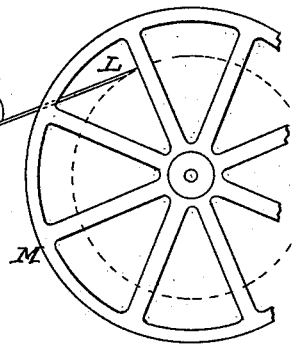
Fig. 23.
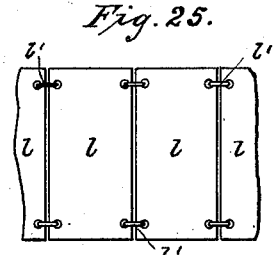
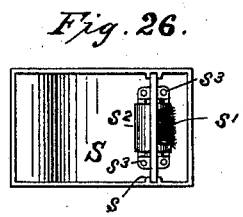
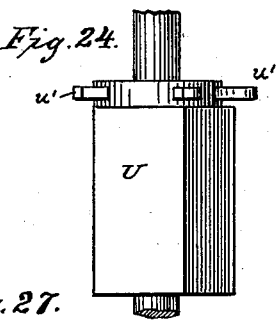
Fig. 25. Fig. 26. Fig. 24.
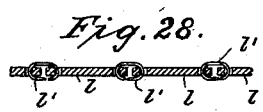
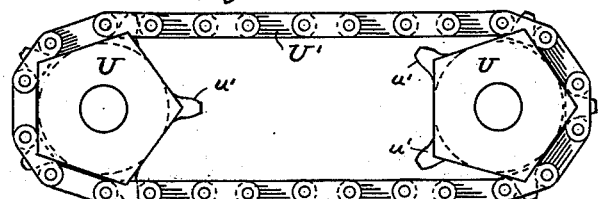
Fig. 27.
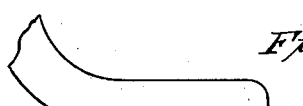
Fig. 28.
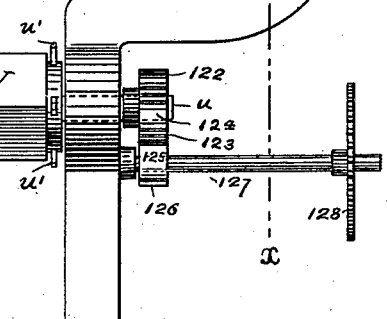
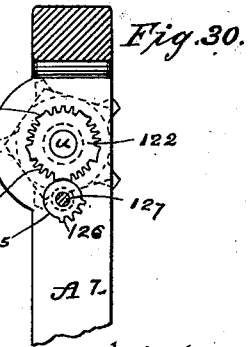
Fig. 29. Fig. 30.
Witnesses Inventor
Robert G. Clyne
By his Attorney

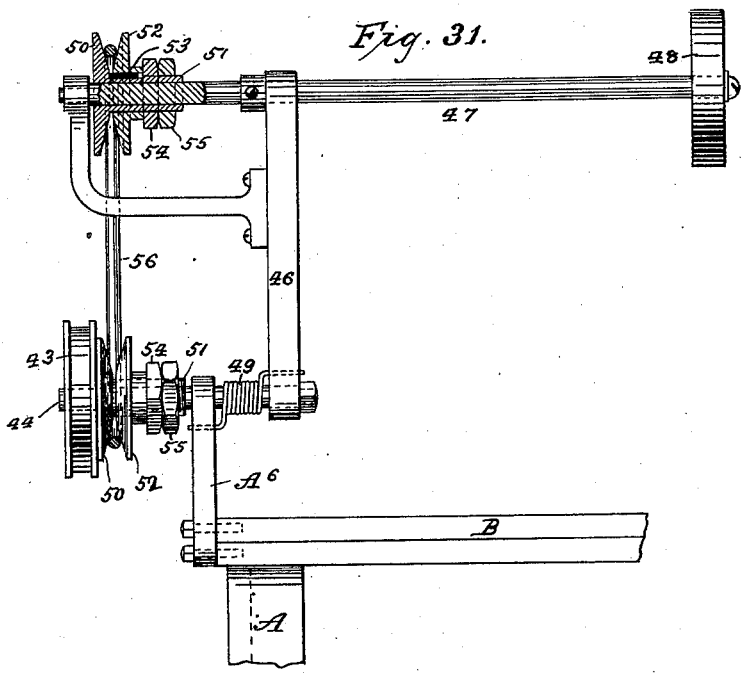

No. 673,421. Patented May 7, 1901.
R. G. CLYNE.
NEWSPAPER WRAPPING MACHINE.
(Application filed Mar. 30, 1898.)
(No Model.) 11 Sheets—Sheet 10.
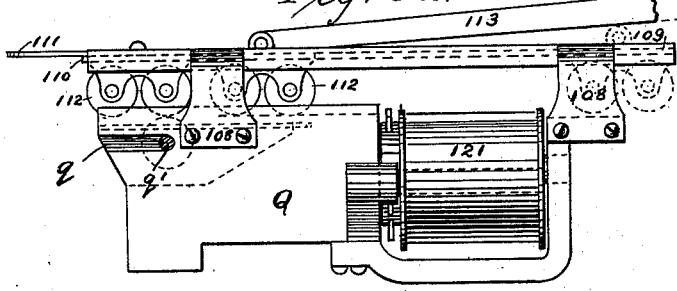
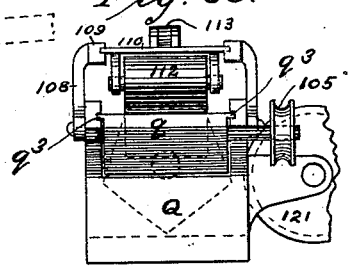
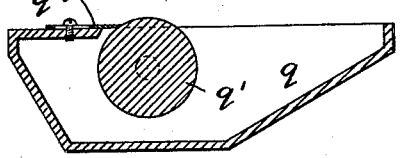
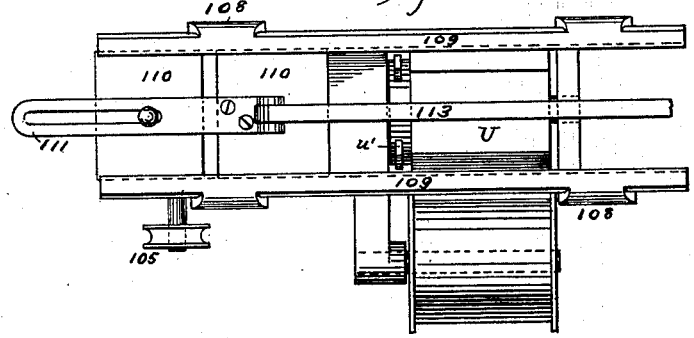

No. 673,421. Patented May 7, 1901.
R. G. CLYNE.
NEWSPAPER WRAPPING MACHINE.
(Application filed Mar. 30, 1898.)
(No Model.) 11 Sheets—Sheet 11.

Witnesses
Geo. E. Frech.
F. R. Fitton

Inventor
Robert G. Clyne,
By Collamer & Co., Attorneys.

UNITED STATES PATENT OFFICE.

ROBERT G. CLYNE, OF MANCHESTER, NEW HAMPSHIRE, ASSIGNOR TO LEWIS E. BATHRICK, OF NEW YORK, N. Y.

NEWSPAPER-WRAPPING MACHINE.

SPECIFICATION forming part of Letters Patent No. 673,421, dated May 7, 1901.

Application filed March 30, 1898. Serial No. 675,711. (No model.)

*To all whom it may concern:*

Be it known that I, ROBERT G. CLYNE, a citizen of Great Britain, residing at Manchester, in the county of Hillsboro and State of New Hampshire, have invented certain new and useful Improvements in Newspaper Folding, Wrapping, and Addressing Machines; and I do hereby declare the following to be a full, clear, and exact description of the invention, such as will enable others skilled in the art to which it appertains to make and use the same.

There are many difficulties to surmount in the production of a machine of this character, among which I may mention that of drawing the wrapper tightly upon the folded paper before pasting and to apply said wrapper in a manner which will prevent any person from removing the paper and replacing it again without tearing the same or to prevent it from slipping off accidentally while in transit through the mails. Another serious difficulty in such machines has been to apply the paste to the wrapper evenly and in a manner to prevent its being squeezed out upon various parts of the machine, where it would come in contact with and besmear the work. These and other defects in the construction and operation of such machines I have effectively overcome in my invention, which has for its objects to provide a machine adapted to fold and wrap a newspaper in a manner to effectively prevent its being replaced in its wrapper after having been removed therefrom without tearing the same, to prevent its dropping out of its wrapper during transit to a subscriber, together with others which will be disclosed in the following specification and claims and clearly illustrated in the drawings accompanying and forming a part of the same.

The invention consists in the various novel mechanisms to be hereinafter specifically described. The wrapper feeding and cutting-off mechanism is automatic and so arranged that it may be instantly adjusted to supply a wrapper of suitable length for any size newspaper, the inner end of said wrapper being cut long enough to be folded in with the second fold of the paper, forming what is known in the art as the "binder." This is very essential, as it effectively prevents the paper from being removed and again placed in its wrapper without detection; and another essential feature in the wrapper feeding and cutting-off mechanism is the clamp combined with the cutter and so arranged that the wrapper may be placed upon the paper very tightly, the rubber rolls located at the back of the machine and through which the wrapper passes affording means, in conjunction with the aforesaid clamp, whereby the package may be done up either loosely or tightly.

My improved paste-box and method of applying paste to the wrapped paper is a very important feature in my invention, as it is positively necessary that a uniform quantity of paste be laid evenly and in such a manner as not to squeeze out upon the outside of the wrapper and stick up the working parts of the machine as well as other papers which they come in contact with, and for this purpose I provide the paste-box with rotary arms carrying small rolls, which keep the paste evenly mixed and deposit a suitable quantity on a supply-roller, and upon this supply-roller bears an adjustable scraper for removing all surplus paste after the corrugations are filled. Then a depositing-roll is arranged to carry the paste from the supply-roll to the wrapped newspaper, leaving a line of little dots of paste, which when the flap of the wrapper is pressed down and moved forward to tighten the wrapper spreads out the dots of paste, covering the entire under side of said flap in sufficient quantity to cause it to adhere firmly to the body of the wrapper.

The mechanism for drawing the wrapper under the paper to be folded is adapted for adjustment to draw any required length of wrapper to accommodate the different sizes of newspaper. It is also important that the back stroke of this mechanism should also be adapted for adjustment, so that it may always cut the flap the proper length to reach about two inches beyond the end of the package in order to be turned over and pasted. This is accomplished by a peculiar arrangement of cams and a forked lever, which will be hereinafter fully described, and shown in the drawings.

Figure 8:
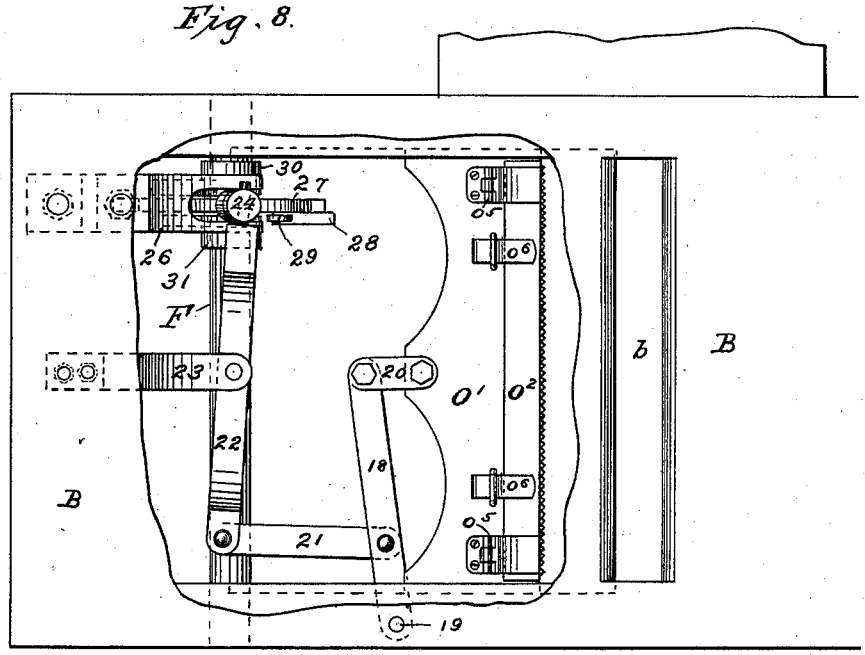
Figure 9:
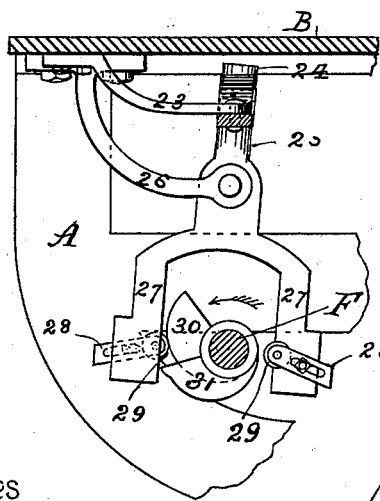
Figure 10:
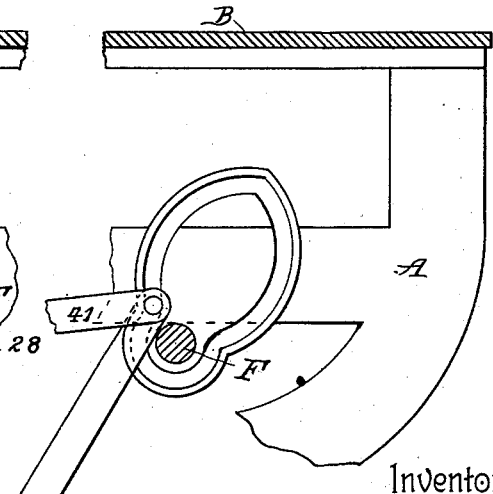
Figure 21:
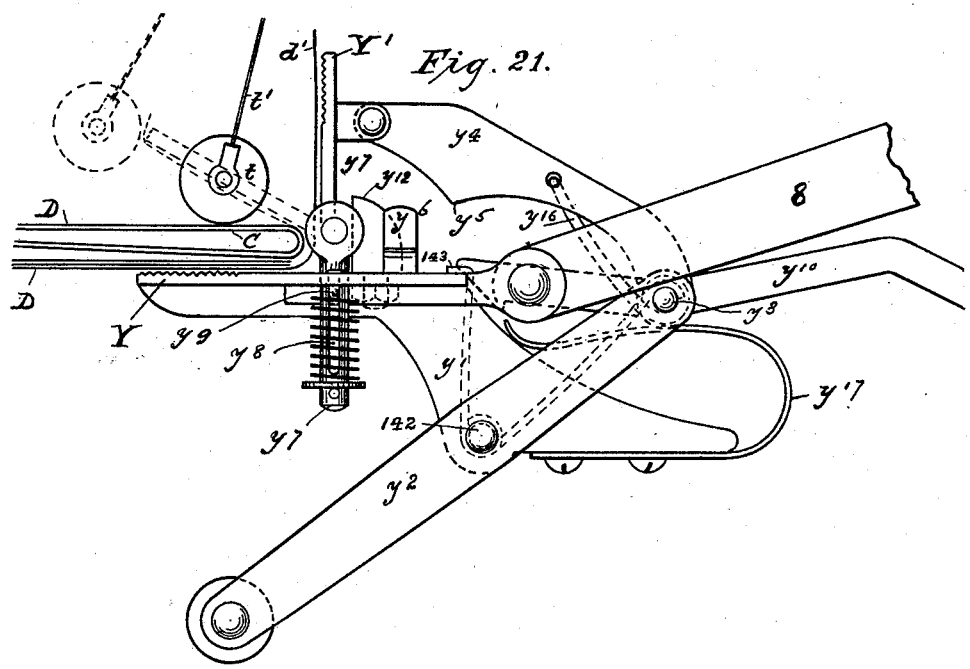
Figure 22:
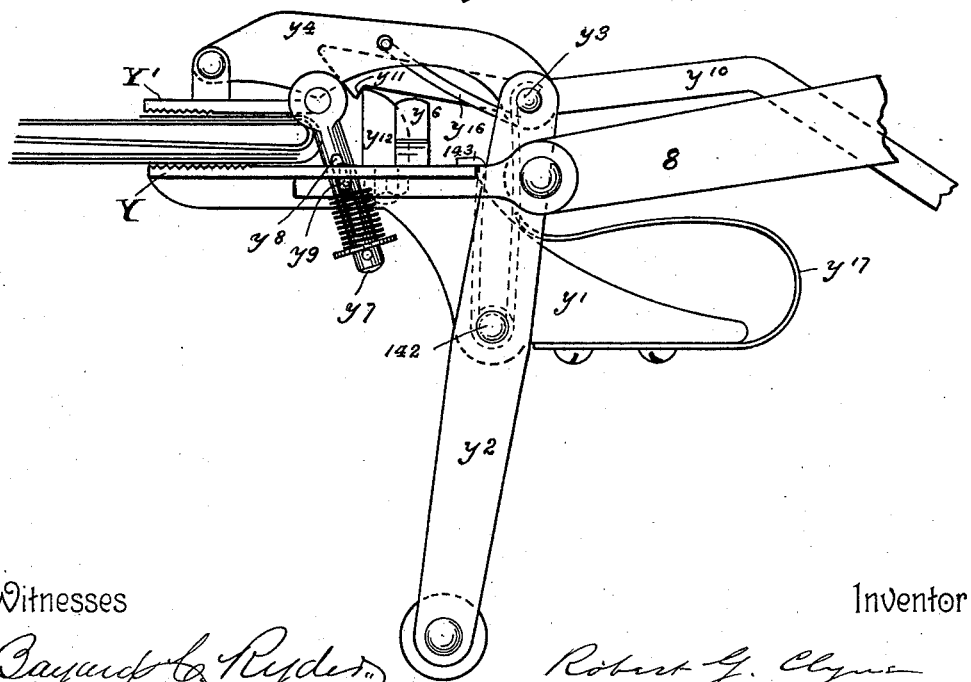
Figure 38:
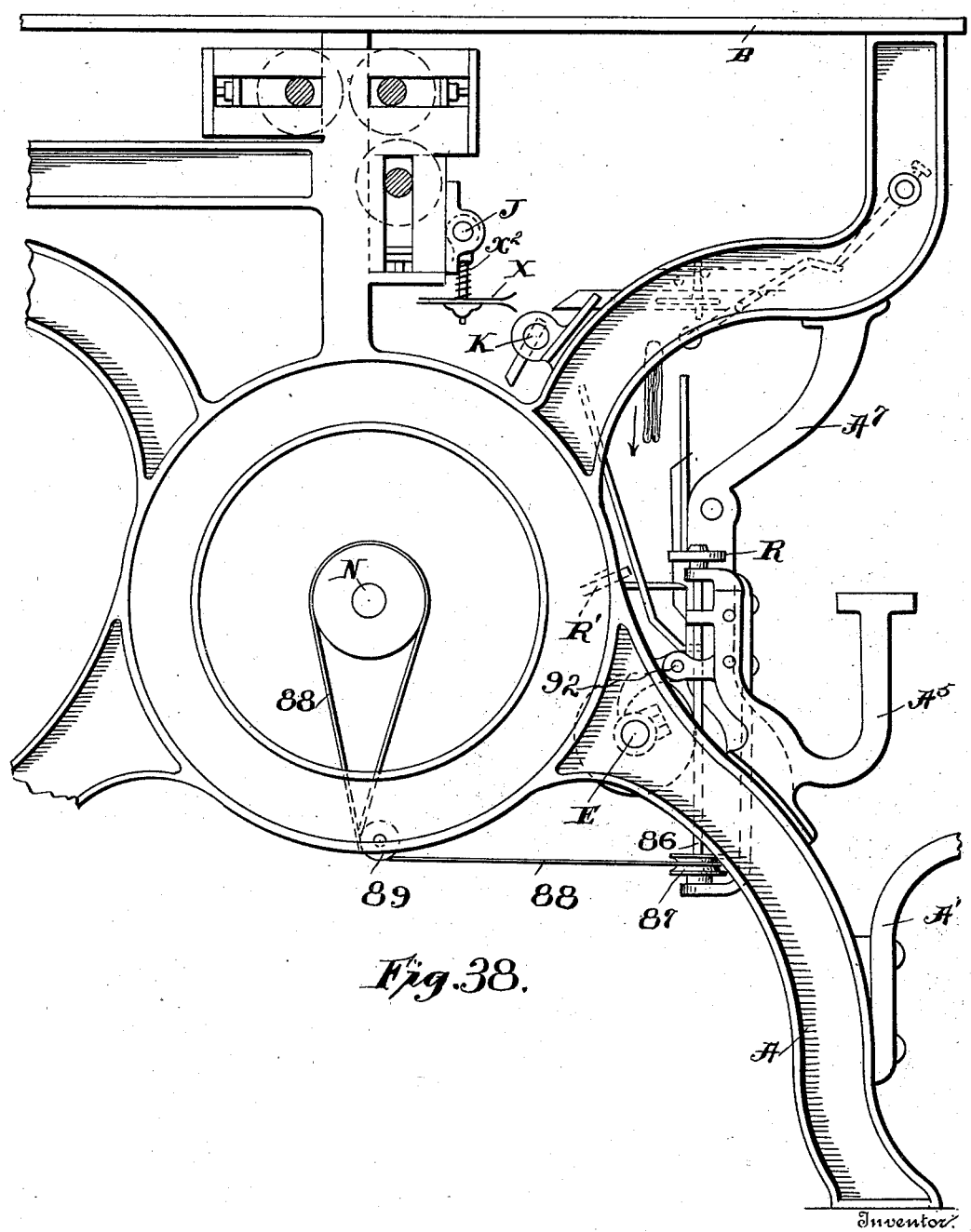

The tension of the wrapper or means for keeping said wrapper tightly drawn before the paper to be folded comes in contact with it is facilitated by means of small friction-rolls located at the rear of the machine and the cutting-off and drawing-out mechanism located forward of the center of the machine. When the top folding-blade presses the paper to be folded between the horizontally-parallel folding-rolls, it draws the wrapper also, both ends of which are held, as above described, until the wrapper and newspaper have passed down vertically to a position opposite the second folding-rolls, (which move the paper horizontally), when the end called the "binder" held by the cutting-off device is then drawn out of the same and assumes its position between the two inside folds of the package. Thus far the wrapper is tight, and as a means of keeping it so during the remainder of the operation and to guard against the binder getting loose I cause the blade which passes the package into the second folding-rolls to come against the folded paper as soon as the latter shall have passed far enough through the first folding-rolls, gradually pressing the paper toward the second folding-rolls. Then the short end of the wrapper (the binder) comes in contact with the second folding-blade, which as the paper passes down to position is gradually pressed a little harder and draws on the binder, keeping it tight until it is folded into the paper. The movement above described is just as if the wrapper were pressed and drawn by one's fingers. By this means it is impossible for the wrapper to get loose, as it is held firmly until the paste is put on, when the only remaining loose part of the wrapper is the flap, which is turned over by a mechanism which moves forward on said flap and draws it up tight.
Referring to the accompanying drawings, which form a part of this specification, Figure 1 is a broken elevation showing the right side of my improved machine, Fig. 2 representing the top of the machine in plan view.
Fig. 3 is a broken elevation showing the left side of my improved machine. Fig. 4 is a sectional elevation showing a portion of the inner side of that part of the frame seen in Fig. 1 and the pressure-bar by which the wrapper is brought in contact with the address belt or chain, together with the cam which operates said bar. Fig. 5 is a sectional elevation showing a portion of the inner side of that part of the frame seen in Fig. 3, the shaft carrying the pressure-bar, a cam on said shaft, and a portion of a bar by which the address-belt-inking mechanism is operated. Fig. 6 is a sectional plan of those parts, with the exception of the pressure-bar, shown in Fig. 5.
Fig. 7 is a portion of the frame and of the shaft which carries the shaft and pressure-bar seen in Figs. 5 and 6, together with a train of gears, shown in dotted lines, which operate the address belt or chain. Fig. 8 is a broken plan showing the table or top of the machine on an enlarged scale, together with a portion of the wrapper drawing and cutting-off mechanism. Fig. 9 is a sectional elevation showing a portion of the table or top of the machine seen in Fig. 8, together with the forked lever and adjustable cams by which said wrapper drawing and cutting-off mechanism is operated, said cams being located near the left side of the machine upon a shaft running from one to the other side. Fig. 10 is a detail showing a cam mounted upon the shaft seen in Fig. 9 near the opposite side of the machine for driving the rack and pinion which operate the paste-depositing roller. Fig. 11 is an enlarged sectional elevation showing a portion of its table or top, the paper-folding blades and rolls, the rotary clamp or carrier for conveying the folded and wrapped paper to the horizontally-movable rest and flap-pressing plate, and the pasting mechanism. Fig. 11$^a$ represents a portion of the machine-frame, to which is attached one of the ways in which moves the flap folding and pressing plate. Fig. 12 is an enlarged detail section showing the table, the folding-rolls, and the upper folding-blade as when passing a paper (represented by a single heavy line) between the first rolls, Fig. 13 being a similar view showing the under folding-blade making the second or final fold in the paper by passing it between the second folding-rolls. In this view the paper is also shown by dotted lines in its normal position before the lower folding-blade has come in contact with it. Fig. 14 is a similar view with the addition of the wrapper drawing and cutting-off mechanism, showing the paper with its wrapper passing through the first folding-rolls. Fig. 15 is a similar view showing the paper and its wrapper after the latter has been cut off and with the lower folding-blade in the act of passing the paper and its wrapper into the second folding-rolls. Fig. 16 represents the folded paper and its wrapper as when first placed in the rotary clamp or carrier. Fig. 17 is a similar view showing the paper and its wrapper as when deposited by the rotary clamp or carrier upon the horizontally-movable rest and flap-pressing plate.
Fig. 18 is an enlarged plan view of the horizontally-movable rest or flap-pressing plate, showing the flap-pressing plate turned down as when pressing the flap. Fig. 19 is an enlarged sectional elevation of a portion of the machine-frame, the folding-rolls and tension devices for adjusting their pressure against each other, the wrapper drawing and cutting-off mechanism in the position when the clamping device would receive the end of a wrapper, the rotary clamp for carrying the paper from the folding-rolls to the flap-folder, seen in dotted lines in a position to receive the paper and in full lines in a position to deliver it, the rack and pinion for operating said rotary clamp, the lower folding-blade, and other movable parts of the machine. Fig. 20 is an enlarged sectional view showing the cutting-off and clamping mechanism after the clamp has drawn the end of the wrapper across and under the opening in the table, through which the upper folding-blade must push a paper. Fig. 21 is an enlarged detailed elevation of the flap-folder, showing a paper in its proper position on the plate with the flap of the wrapper turned up against the folder and the paste-applying roll in position to apply paste to the wrapper under the flap and showing in dotted lines the folder carrying the flap down upon the wrapper and the paste-applying roll as when applying paste to the extreme edge of the flap. Fig. 22 is a similar view of the same mechanism after it has folded the flap of the wrapper. Fig. 23 is a sectional elevation showing the address-belt, the drums on which it is carried, the cleaning-box and brush contained therein, and the polygonal rolls over which the address-belt passes. Fig. 24 is an enlarged plan showing one of the polygonal rolls with its sprocket. Fig. 25 is a broken plan view showing a few of the plates or links forming the address-belt. Fig. 26 is a plan view of the cleaning-box shown in Fig. 23. Fig. 27 is an enlarged elevation of the two polygonal rolls with their sprockets and a driving-chain connecting them. Fig. 28 is a longitudinal sectional view of the address-belt, showing the wire rings or links by which the plates are connected. Fig. 29 is an enlarged broken elevation of a portion of the frame mounting one of the polygonal rolls with a portion of its driving mechanism. Fig. 30 is a sectional elevation taken on line X of Fig. 29. Fig. 31 is an enlarged sectional elevation of that form of wrapper-feeding mechanism shown in Fig. 1. Fig. 32 illustrates a modified form of wrapper-feeding mechanism, and Fig. 33 is a sectional elevation taken on line Y of Fig. 32 and shows a portion of the frame with the moving parts removed. Fig. 34 is an enlarged detailed elevation of the device for applying ink to the address-belt, Fig. 35 showing the same in end view. Fig. 36 is an enlarged detached section of the ink-well and its supply-roll and scraper. Fig. 37 is a plan view of the inking apparatus, showing the manner of connecting the ink-roll trucks, whereby one truck only is permitted to pass over the address-belt, while the other truck simply carries a supply of ink to a plate, from which the other distributes it over the said belt. Fig. 38 is an enlarged detail, in side elevation, showing the relative position of the flap-folding device and the discharging-rolls and illustrating a wrapped package as dropping from one to the other.

A represents the side frames of the machine, and B is its top or table, having a slot $b$, through which a paper is passed to the folding-rolls.

The newspaper is represented by a single heavy line C, and the wrapper D is also represented by a single line, and this is drawn from a roll mounted upon brackets placed at the rear end of the machine.

The frame carries numerous shafts on which are mounted cams, gears, and arms or levers for performing the various functions to be hereinafter explained. The shafts passing from one to the other of the side frames are shown at E, F, G, H, I, J, and K.

L is an address-belt composed of suitable links $l$, on each of which appears the name and address of a subscriber.

M represents drums on which the address-belt is wound from one to the other, as occasion requires, and when the belt has been wound from one drum to the other the drums are removed and their positions transposed, the full one taking the place of the empty one, and vice versa. One of the drums is mounted in bearings $a$, formed in the side frames A, the bearings for the other being provided in the brackets A', as shown in Figs. 1 and 3.

N is a short shaft carrying the main driving-pulley $n$, which in the drawings is shown to be driven by a belt $n'$, passing through the floor. One end of said shaft N is carried in a bearing formed in one of the side frames A, and the other in a bracket $A^2$, which is attached to said frame.

$A^3 A^3$ are brackets attached to the machine for carrying a roll of wrapping-paper D, and to each side frame is attached a bracket $A^4$ for carrying the spring-adjusted tension-rolls P for said wrapping-paper.

$A^5$ is a bracket adapted for supporting the inking device Q and the discharge-rolls R R', to be hereinafter explained.

S is the cleaning-box through which the address-belt passes in going from one to the other of the winding-drums M.

T is a paste receptacle or box.

U represents the polygonal rolls over which the address-belt passes.

V V' $V^2$ are the folding-rolls, the roll V being mounted on a horizontal plane with roll V', and roll $V^2$ on a vertical plane with roll V'.

W W' are arms or levers having rigidly attached at one end, respectively, a blade $w$ $w'$ for making, respectively, the first and second or last fold of a newspaper, the arm W rocking in bearings formed upon or attached to the table B, while the arm W' is mounted on the shaft G.

The rotary clamp or carrier (shown in full lines in Fig. 11 in position to receive the folded package and in Fig. 19 in a position to deliver the package to the flap-folding device) consists of plates X X', connected by arms $x$ to the shaft J, that plate the most remote from said shaft being pivotally attached to the bent end $x'$ of either arm $x$, while the plate X' is loosely mounted upon said arms and normally forced against the plate X by the helical springs $x^2$, one of which is carried upon each arm $x$. The plates may be slightly separated on one side by two or more studs or by a flange $x^3$, (shown in the drawings as formed upon one edge of the adjustable or clamping plate X,) while the opposite sides or edges of said plates are curved in a direction away from each other, so as to readily receive a package. The plate X' is provided at each end with a projection or roll $x^4$, which by striking the lug or projection $x^5$ (seen attached to the frame of the machine in Figs. 11 and 19) causes the curved edges or mouth of the clamp X X' to open for the reception of a package, and when the clamp is in its lower position the same rolls $x^4$ come in contact with a double-ended lever 1, mounted on shaft I, the opposite end of said lever being operated by a suitable cam secured to shaft F and at the proper time to open said rotary clamp for delivering the package to the flap-folding device. This consists, essentially, of a horizontally-disposed and movable plate Y and a folding-plate Y' attached thereto. The ends of the plate Y fit into ways $y$, attached horizontally to the side frames A, as best seen in Fig. 11$^a$. A portion of the adjacent surfaces of the plates Y Y' is serrated, as seen in Figs. 21 and 22, to prevent the packages from slipping, and a bracket $y'$ is attached near each end on the under side of the plate Y, to each of which is pivoted a rocker $y^2$, the upper ends of said rockers being connected by a shaft $y^3$, upon which is loosely mounted levers $y^4$, the opposite ends of which are connected to the folding-plate Y' and are provided on their under side with a projection $y^5$, adapted to engage a standard $y^6$ at the proper time while the plate Y' is being turned over to raise said plate for the accommodation of the package upon which it is to rest, this being rendered possible by reason of the peculiar hinge connection of the two plates Y Y', which consists in pivotally connecting the ends of the plate Y' with the upper end of studs $y^7$, which pass downward through elongated openings formed for the purpose in the plate Y. The studs are perforated by an elongated opening $y^8$ for the reception of a suitable pin $y^9$, attached to the plate Y, and they are each provided with a helical spring operating expansively between said pin and a washer and pin at the opposite end of said studs, which construction permits the pivotal point of said plate Y' or the studs to vary automatically both vertically and laterally, as seen in Fig. 22. To the shaft $y^3$ is loosely attached, about midway from its ends, a lever $y^{10}$, one end of said lever having on its under side a hook $y^{11}$ for engaging the lug $y^{12}$, secured to the plate Y, as seen in Figs. 18 and 22, the engagement of the hook and lug being insured by means of a helical spring $y^{13}$, mounted on the shaft $y^3$, one end of said spring being connected to said lever and the other to a nut $y^{14}$, which is threaded to said shaft and provided with a check-nut $y^{15}$, as shown in Fig. 18, whereby the tension of said spring may be readily increased or decreased, as required. The movement of the plate Y' is facilitated by the action of helical springs $y^{16}$, placed on the shaft $y^3$, one end of each spring being connected to a lever $y^4$ and the other to a nut which is threaded to said shaft and provided with check-nuts in a manner similar to the spring actuating the lever $y^{10}$, as seen in Fig. 18.

The mechanism which moves the plate Y in its horizontal ways comprises a cam 2, mounted on shaft F, said cam having a side groove in which fits a stud 3, pivotally connecting one end of the bar 4 and its supporting-rocker 5, attached to the side frame A, a lever 6, connecting the other end of the bar 4 with the shaft H, a lever 7, also mounted on the shaft H, and the bar 8, connecting the free end of said lever 7 with said plate Y, as seen in Figs. 1, 11, 18, 21, and 22.

The mechanism for throwing over the flap folder or plate Y' is as follows: When the plate Y is moving backward, the rear end of the lever $y^{10}$ comes in contact with the arm 9, mounted on the shaft 10, as shown in Fig. 11, said arm by means of set-screw 900 being capable of adjustment to various angles upon said shaft for engaging the lever at different points in the stroke of the plate. The contact of said latch-lever with the arm 9 releases the hook $y^{11}$ from its lug $y^{12}$. Then as the plate Y moves forward the lower end of the rockers $y^2$ are moved back from the position shown in Fig. 21 to that shown in Fig. 22 by contact with the levers 11, rigidly mounted on a rock-shaft K, actuated by a lever 13, connected by the link 14 to the upper end of a rocker 15, pivoted at 16 to one of the side frames A, said rocker having its end in contact with a cam 17, mounted on the shaft E. The forward impulse given by this movement of the rocker not only turns the plate Y' on its pivot, so as to throw the flap $d'$ down upon the package, but slides the plate forward slightly thereover, (which is permitted by its peculiar hinge,) so as to draw the flap tightly around the package. When the plate Y' is in the position seen in Fig. 21, the folding movement is aided by reason of the spring $y^{16}$, as shown best in Fig. 21, said spring being attached to the bracket $y'$.

The folding-rolls should be automatically adjustable toward and away from each other, and this is easily accomplished by mounting their bearings in ways such as illustrated in Fig. 19. The ways $v$ contain also a follower $v'$, a helical spring $v^2$, operating expansively between the bearing and said follower, and a threaded stud $v^3$, passing loosely through said follower and rigidly secured to the ends of the ways and provided with a threaded nut $v^4$ for varying the tension of the springs by contact with the followers.

The wrapper drawing and cutting-off mechanism comprises a stationary plate or feeder O, extending across the machine between the side frames A A and supported by thin metal extensions $o$, secured by screws to the side frame, as seen in Fig. 19, said feeder being provided with an additional support consisting of the spring $o'$, whose tension may be adjusted by the screw $o^2$, a horizontally-movable plate O', having its edge beveled, as at $o^3$, and the sharp edge serrated, as seen in Fig. 8, and a clamping-plate $O^2$, having its edge beveled, as at $o^4$, so that the feeder O may easily enter and force the wrapper D between the plates O' O². The clamping-plate O² is hinged at $o^5$ to the plate O', as shown in Figs. 8 and 19, and its clamping power is produced by springs $o^6$. The plate O' runs in ways formed in the side frames A A and is moved to and fro by a peculiar mechanism, which I will now describe. A lever 18, having one end attached to the under side of the table at 19, as seen in Fig. 8, is connected at its other end by a link 20 to the plate O' at a point midway between its ends, and a link 21 connects the lever 18 at a point between its ends with one end of a lever 22, supported by a bracket 23, attached to the under side of the table B, and the other end of said lever 22 is pivotally connected to a sleeve 24, attached to the upper end of a forked rocker 25, pivotally connected to a bracket 26, attached to the under side of said table B, the forks 27 of said lever 25 being provided with adjustable plates 28, which may carry friction-rolls 29 for contact with the cams 30 31, mounted upon and near one end of the shaft F. By adjustment of the plates 28 on the forked rocker 25 the plate O', and hence the clamp, may be given a long or short stroke, as may be desired, in order to draw off the required length of wrapper.

Before starting the machine the wrapping-paper D is forced through the tension-rolls P P and drawn along by hand underneath the table B until its end falls over the feeder O. Then when the machine starts the clamp formed of the plates O' O² moves along to the position shown in Fig. 19 and far enough to cause said clamp to be opened by the feeder O, and when the clamp moves away from the latter it retains the end of the wrapper D, as shown in Fig. 20. Then the newspaper C is forced through the slot b of the table B by the folding-blade w, drawing the wrapper D through the said tension-rolls until the wrapper and newspaper enter the first folding-rolls V V', when the strain caused by the folding-rolls causes the clamp to release the end of wrapper D, and both paper and wrapper continue downward until that point is reached at which they should enter the second folding-rolls V' V², when the folding-blade w' (which during the foregoing operation has been in the position seen in Fig. 14) moves toward the newspaper, as seen in Fig. 15, and forces the same between said rolls, the strain of which has caused the wrapper D to be torn from the sharp or serrated edge of the beveled portion $o^3$ of the plate O', forming a portion of the wrapper-drawing-out clamp, the latter having again moved upon the feeder. The rolls V' V² carry the folded package to the rotary clamp formed of the plates X X', said package being then in form shown in Fig. 16, having the inner end or binder d of the wrapper D in the desired place. The rotary movement of said clamp turns said package for delivery upon the flap-folding device, so that it assumes the position seen in Fig. 17, the flap d' of the wrapper D being thrown up into contact with the folder Y', as best illustrated in Fig. 21, ready to be folded down, as seen in Fig. 22. Before folding down said flap, however, paste must be applied to the wrapper. This is accomplished by a suitable distributing-roll t, carried in arms t', which in the drawings are mounted on a shaft $t^2$, running through the paste-receptacle T, (shown best in Fig. 11,) and the arms t' may be formed of spring metal. The movement of said roll and of the folder Y' from their full-lined to their dotted-lined positions in Fig. 21 are properly timed, so as to cause said roll to apply paste to the wrapper and to the extreme edge of the flap d' (which extends beyond the edge of the folder Y' for this purpose) as the folder swings downward. Paste is applied to the roll t by a supply-roll $t^3$, which receives its supply from rolls $t^4$, carried in the ends of revolving arms $t^5$, mounted on a shaft $t^6$, and a scraper $t^7$, bearing upon the roll $t^3$, maintains a thin even coating of paste on the latter. The supply-roll $t^3$ has on one of its journals, as shown in Fig. 1, a pair of pulleys, the larger one, 32, being shown in full lines, while the smaller one is shown in dotted lines and connected by a belt 33 with a pulley 34, mounted on a journal of the shaft $t^6$. A stud 35, projecting from one of the side frames A, carries a cone-pulley, the larger cone 36 being connected by belt 37 with a pulley on the shaft N, from which said cone-pulley derives its power, and one of the smaller cones is connected by belt 38 with the pulley 32, all of which is shown in Fig. 1. The shaft $t^2$ has on one of its journals a gear-pinion 39, driven by the movable rack 40, said rack being connected by a bar 41 with a suitable cam mounted on the shaft F, said bar being supported by a rocker similar to the rocker 5 and pivoted to the frame A upon the inner end of the stud carrying said rocker 5.

It is desirable that the wrapper-drawing-out clamp composed of the plates O' O² should draw the wrapper with as little resistance as possible over and above the necessary strain required to draw the wrapper tight on the newspaper, the tension-rolls P P being sufficient for the purpose. Hence some suitable mechanism should be provided for paying out the wrapper D from the roll, so that the said clamp shall not have the additional strain of unrolling the wrapper. In Figs. 31 and 32 I show a device for the purpose of unrolling the wrapper on an enlarged scale, the slight difference in construction between the two views being simply in the means for varying the speed of the contact or wrapper-paying-out roll. In each construction a bracket $A^6$ serves to connect the device to the machine, as seen in Figs. 1, 31, and 32, which device is driven by a belt 42, connecting the cone-pulley 36 with a pulley 43, mounted upon a shaft attached to or running in the bracket $A^6$. In Fig. 31 said pulley 43 runs loose on the shaft 44, while in Fig. 32 the shaft 44 is made hollow and contains a shaft 45, to which the said pulley 43 is rigidly attached. A frame 46 is pivotally connected at one end to the shaft 44 and carries at its other end a parallel shaft 47, at one end of which is secured the wrapper-paying-out roll 48. A suitable spring 49 connects the bracket $A^6$ with the frame 46 in a manner to cause the latter to normally bear toward the brackets $A^3$, and thus hold the roll 48 normally in contact with the roll of wrapping-paper. The shaft 47 may be driven at various speeds either by a belt and pulleys, as in Fig. 31, or by bevel and frictional gearing, as in Fig. 32.

The pulleys shown in Fig. 31 consist of two sections, one of which sections, 50, is provided with a hub 51, upon which the other section 52 is loosely splined, so that it may move longitudinally thereon. The adjacent surfaces of the sections 50 52 of these pulleys are beveled, so that when together they have the appearance of a grooved pulley, the purpose of which they actually serve. This spline is shown at 53, and the hub 51 is externally threaded and provided with a nut 54 and a check-nut 55, so that the sections 50 and 52 of the pulleys may be adjusted toward or away from each other in order that the speed of the shaft 47 may be increased or decreased with relation to speed of the pulley 43, which is attached to one of the adjustable grooved pulleys, by causing the belt 56 to draw nearer the center of one pulley than of the other. In Fig. 32 the shaft 44 is made hollow and contains a shaft 45, to one end of which is rigidly attached the driving-pulley 43, while at the other end is secured a bevel-gear 57, meshing with a corresponding gear 58, mounted upon one end of a shaft 59, which runs in ears 60, formed for the purpose on the frame 46, and at the other end of the shaft 59 is secured a disk 61, which rotates a friction-roll 62, having a tapering externally-threaded hub 63, provided with one or more slots 64 and with a threaded nut 65, by which said hub may be adjustably secured upon the shaft 47 and at the proper point of engagement with the disk 61 to drive the contact-roll 48 at the desired speed. The rotary clamp mounted on the shaft J is driven by a pinion 66, meshing with a rack 67, running in a way 68, attached to one of the side frames A, said rack 67 being connected to one end of a bar 69, the opposite end of which is supported by a rocker 70, which is attached to the frame A. The pivot-pin 71, connecting the bar 69 and rocker 70, is adapted to enter a groove 72, formed for the purpose in one side of a cam 73, mounted on the shaft F, as best shown in Fig. 3. The folding-rolls V V' $V^2$ are connected by long-toothed gears 74, and upon one journal of the roll V' is also attached a pulley 75, connected by a belt 76 with a pulley 77, carried on the shaft N, by which said folding-rolls are operated. Either winding-drum M which happens to be in the bearings $a$ is revolved by a contact or friction roll 78, mounted on a shaft 79, carried in a suitable frame 80, having mounted at its opposite end a shaft 81, on which is mounted a belt-pulley 82, connected by belt 83 with a pulley on the shaft F, a belt 84 connecting a small pulley 85 on shaft 79 with a similar pulley on the shaft 81.

The package-discharging rolls are mounted and operated as follows: The driving-roll R is secured to upper end of a vertical shaft 86, carried in bearings formed on a portion of the bracket $A^5$, the lower end of said shaft 86 carrying a pulley 87, (preferably a grooved one,) connected by a belt 88 with the idlers 89, (placed at an angle, as shown in Fig. 1,) and the driving-pulley 90, mounted on the shaft N, the pressure-roll R' being mounted at the upper end of a bar 91, which is pivotally connected at 92 to the bracket $A^5$ in such manner as to fall by gravity away from the roll R and to be moved toward said roll by the contact of its arm $r$ with a cam 93, mounted on the shaft E. These rolls R R' are separated when the wrapped package is dropped from the flap folding and pasting device into the pocket 94, (seen best in Fig. 4,) one end of the said package reaching out between said rolls R R', and after the pressure-bar 95, which is loosely mounted upon the shaft E and operated by the contact of its arm 96 with a cam 97, mounted on the shaft N, shall have pressed the package with sufficient force against the address-belt L to print the address of a subscriber upon the wrapper of said package, the bar 91, carrying the roll R', is moved by the cam 93, causing the roll R' to come in contact with the package, when the driving-roll R causes the said package to leave the pocket 94 and drop onto a shelf 98, secured to the free end of a lever 99, pivoted at its lower end to one of the side frames A, as seen at 100 in Fig. 1, the object of this lever 99 being to deposit the wrapped package into a suitable receptacle in an orderly manner rather than that the packages should be shot out upon the floor in a confused pile. For this reason I connect the lever 99 by means of the link 101 with one end of a lever 102, which is attached to one of the side frames A and is operated toward the lever 99 by means of its stud 103 bearing upon or against the cam 104, mounted on the shaft E, all of which is shown in Fig. 1.

The inking of the address-belt is accomplished as follows: The case Q carries at one end a removable ink-well $q$, provided with a roll $q'$ and an adjustable scraper $q^2$, adapted for contact with the roll, as shown best in Fig. 36. The ink-well may be supported in the case Q by side tongues $q^3$, which fit grooves in the said case, as seen in Fig. 35, and the journal of the roller $q'$ carries a grooved pulley 105, driven by a belt 106, passing over idler-pulleys 107, and thence around the cone-pulley 36. Brackets 108, attached to the case Q, support ways 109, to which are fitted truck-frames 110, (shown best in Figs.

34, 35, and 37,) and these frames are linked together by the plate 111, which is rigidly attached to one truck-frame and loosely connected to the other in order that one truck may be moved a given distance before the other when both move together, for a purpose to be hereinafter explained, and the frames carry inking-rolls 112, one roll of one truck resting normally on the revolving ink-supply roll $q'$, as seen in Fig. 34, while both rolls of the other truck bear upon the top plate of the case Q and distribute the ink left upon said plate by the rolls of the other truck over the links of the address-belt L in the following manner: The truck-frame 110, to which the link-plate 111 is rigidly attached, is connected, as seen in Figs. 34, 35, and 37, to a driving-bar 113, the opposite end of which is attached to the upper end of a rocker 114, having its lower end pivoted at 115 to either the frame A or to the bracket A' and being connected at 116 to a double-ended lever 117, pivotally connected at 118 to a bracket 119, the other end of said double-ended lever being actuated by a grooved cam 120, said cam being mounted on the shaft E, as clearly shown in Fig. 6, by which cam and connecting-levers the inking-trucks are moved from end to end of the ways 109. The address-belt L, whose links $l$ are connected by suitable wire rings $l'$, in passing from one to the other of the drums M passes under a flanged roll 121, carried on the case Q and over the polygonal rolls U, one of which is mounted in the case Q, as seen in Figs. 34, 35, and 37, and the other in the frame or bracket $A^7$, as clearly shown in Figs. 23, 29, and 30. The rotation of these rolls U must be intermittent in order that the inking of the address-belt L and the printing of the address upon a wrapped package may be effected. For this reason that roll U which is mounted in the bracket $A^7$ has attached to its projecting journal $u$ a special gear 122, having at regular intervals a few teeth 123 and blanks between the series of teeth, said blanks 124 being nearly or quite as long as the teeth. This gear 122 meshes with a gear-segment 125, having the right number of teeth 126 to rotate the gear 122 one-fifth of a revolution, said gear-segment 125 being mounted upon a shaft 127, one end of which is carried in the bracket $A^7$ and the other in a bracket $A^8$, attached to a side frame A. The shaft 127 is provided with a gear 128, connected by a train 129 130 131 with the shaft E, and in order that the polygonal rolls U may move in unison each is provided with sprockets $u'$ and connected by sprocket-chain $U'$, as seen in Fig. 27. Thus both rolls U are held quiet long enough to allow the ink-rolls 112 to pass over each address on the belt L and the pressure-bar 95 to print the impression of the address on the package. From the rolls U the address-belt L passes through the cleaning-box S, which may be partially filled with benzene or other suitable cleaning liquid, where said belt comes in contact with a cleaning-brush $s'$, which may be adjustably secured between flanges $s$, formed in the sides of the box S, and thence said address-belt passes under a roll $s^2$, supported in standards $s^3$ within said box S, and onward to the other drum M, on which it will be wound all clean and ready for use again.

The arm W, carrying the folding-blade $w$, is secured to a shaft 132, mounted in bearings 133 upon the top of the table B, and said shaft is rocked the proper distance to enable the blade $w$ to perform its work by the lever 134, having one of its ends attached to said shaft and the other may be provided with a roll 135, bearing upon a cam 136, mounted on shaft E, as seen in Fig. 3, and the arm W', to which is attached the folding-blade $w'$, is operated by a lever 137, mounted at one end on the shaft G, its other end being adapted for contact with a cam 138, carried on the shaft E. (See Fig. 3.)

139 represents adjustable guides, having elongated openings 140, through which screws 141 are passed and threaded to the table B.

Although the spring $y^{16}$ aids in diminishing the pressure upon a wrapped package of the clamp composed of the plates Y Y', still the prime factor in elevating the flap-folder Y' to its vertical position (seen in Fig. 21) is a spring 143, which is coiled around the shaft 142, connecting the brackets $y'$, and upon which are mounted the rockers $y^2$, one end of said spring 143 being hooked over the rear edge of the plate Y and the other end being hooked over the shaft $y^3$, as best shown in Fig. 18 and shown also in Figs. 21 and 22.

The inner end of the shaft N is used as a stud for carrying a loose pulley or sprocket 144, to which the cam 97 is attached, as seen in Fig. 4, said sprocket 144 being revolved by a belt or sprocket-chain 145, passing over a sprocket 146, mounted upon and driven by shaft E.

It is quite essential that all the revolving pulleys and connections of this machine should be as nearly as possible positive and without liability of lost motion by slipping. Hence I may mention that the pulleys and belts, with the exception of the pulleys $n$ and 50 and belts $n'$ and 56, all are preferably sprockets and chains, although not so represented in the drawings, in order to avoid complications.

Having described my invention, what I claim is—

1. A machine of the character described the wrapper drawing and cutting-off mechanism consisting of a horizontally-movable plate, a spring-actuated clamp thereon, and a stationary plate having an operative edge, said clamp being related to the stationary plate in a manner to receive the wrapper therefrom whereby the movement of the plate serves to draw the wrapper into position to receive a paper to be folded, folding-rolls adjacent to the wrapper drawing and cutting-off mechanism, and means for urging the wrapper and paper into operative relation with said rolls.

2. In a machine of the character described, the combination with wrapper drawing and cutting mechanism comprising a horizontally-movable plate having a serrated edge, a spring-actuated clamp secured upon the horizontally-movable plate, and a stationary feeder-plate over which the wrapper passes, said clamp being related to the stationary plate in a manner to receive the wrapper therefrom to permit said wrapper to be drawn into position to receive the paper to be wrapped, folding-rolls adjacent to the wrapper drawing and cutting-off mechanism, and means for causing the wrapper and paper to be operated upon by the folding-rolls.

3. In a machine of the character described the combination with mechanism for drawing out and cutting the wrapper, of folding-rolls in operative proximity thereto, and folding-blades arranged to fold a paper and wrapper and to urge them between the folding-rolls in a manner to form a "binder" at the inner end and a flap at the outer end of the wrapper.

4. In a machine of the character described the combination with wrapper drawing and cutting-off mechanism comprising a horizontally-movable plate having its edge serrated, a spring-actuated clamp secured upon the plate and a stationary feed-plate arranged to deposit a wrapper under the clamp, and folding mechanism arranged to receive the wrapper and a paper to be wrapped from the wrapper drawing and cutting-off mechanism.

5. A machine of the character described, combining folding blades and rolls, a rotary clamp or carrier for receiving the wrapped package from said folding-rolls, a horizontally-movable plate adapted to receive the package from the rotary carrier and provided with a flap-folding device, a paste-box and means for carrying and applying the paste to the wrapper and its flap, suitable arms forming a pocket for the reception of the wrapped package, and means for discharging said package from said pocket.

6. A machine of the character described, combining folding blades and rolls, a rotary clamp or carrier for receiving the wrapped package from said folding-rolls, a horizontally-movable plate adapted to receive the package from the rotary carrier and provided with a flap-folding device, a receptacle for paste provided with a supply-roll and a distributing-roll for carrying paste from said supply-roll to the wrapper and its flap, suitable arms forming a pocket for the reception of the wrapped package, and means for discharging said package from said pocket.

7. A machine of the character described, combining folding blades and rolls, a rotary clamp or carrier for receiving the wrapped package from said folding-rolls, a horizontally-movable plate adapted to receive the package from the rotary carrier and provided with a flap-folding device, a receptacle for paste provided with a supply-roll, means for maintaining an even thickness of paste on said roll and a distributing-roll adapted to carry paste from said supply-roll to the wrapper and its flap, suitable arms forming a pocket for the reception of the wrapped package, and means for discharging said package from said pocket.

8. A machine of the character described, combining folding blades and rolls, a rotary clamp or carrier for receiving the wrapped package from said folding-rolls, a horizontally-movable flap-turning device adapted to receive the package from the rotary carrier, a paste-box having a rotary shaft and arms provided with rolls for carrying paste to a supply-roll, the said supply-roll, and rockers supporting a distributing-roll adapted to carry the paste from the supply-roll to the wrapper and its flap while the latter is upon said flap-turning device, suitable arms forming a pocket for the reception of the wrapped package, and means for discharging said package from said pocket.

9. In a machine of the character described the combination with a flap folding and clamping device comprising a horizontally-movable plate, and a loosely-hinged automatically-adjustable pressure-plate having both lateral and longitudinal movement with respect to the first-named plate of means for actuating the pressure-plate to clamp a package supported upon the first-named plate and to move it in a direction to draw the flap of the package for the purpose of tightening the wrapper.

In testimony whereof I affix my signature in presence of two witnesses.

ROBERT G. CLYNE.

Witnesses:
J. B. THURSTON,
W. E. DREW.